United States Patent [19]

Keyes et al.

[11] Patent Number: 5,479,161
[45] Date of Patent: Dec. 26, 1995

[54] AUTOMATIC CALIBRATION OF REDUNDANT SENSORS

[75] Inventors: Charles L. Keyes, Forest Lake; Douglas M. Weed, Maple Grove, both of Minn.

[73] Assignee: Honeywell Inc., Minneapolis, Minn.

[21] Appl. No.: 218,485

[22] Filed: Mar. 25, 1994

[51] Int. Cl.⁶ .................................................. G08C 19/22
[52] U.S. Cl. ........................... 340/870.04; 340/870.01; 340/508; 73/1 E; 244/194; 364/453; 364/571.02
[58] Field of Search .................. 340/870.01, 870.04, 340/945, 508, 4; 73/1 R, 1 E; 364/571.01, 571.02, 453; 244/175, 194, 195

[56] References Cited

U.S. PATENT DOCUMENTS

| | | | |
|---|---|---|---|
| 3,549,108 | 12/1970 | Smith | 244/194 |
| 4,254,465 | 3/1981 | Land | 364/453 |
| 4,327,437 | 4/1982 | Gelderloos | 244/194 |
| 5,166,882 | 11/1992 | Stambaugh | 364/453 |
| 5,194,872 | 3/1993 | Musoff et al. | 364/453 |

OTHER PUBLICATIONS

"Autocalibration of a Laser Gyro Strapdown Inertial Reference/Navigation System" by Knut M. Wefald and Charles R. McClary Dated: 1984 IEEE (pp. 66–74).

*Primary Examiner*—John K. Peng
*Assistant Examiner*—Daniel J. Wu
*Attorney, Agent, or Firm*—Charles J. Ungemach

[57] ABSTRACT

A system for calibrating the sensors of a redundant sensor system by calculating a first set of error signals based on differences between a combination of the outputs and known values and calculating a second set of error signals based on differences between the parity among preselected sensors and a predetermined value and calculating, from the first and second set of error signals, a plurality of calibration signals to be added to the output of the individual sensors which are in error so as to correct their outputs.

17 Claims, 2 Drawing Sheets

AUTOMATIC CALIBRATION OF REDUNDANT SENSORS

BACKGROUND OF THE INVENTION

1. Field of the Invention

The present invention relates to automatic calibration of sensors used in systems and more particularly to the automatic calibration of redundant sensors (more than one set of sensors sensing the same conditions).

2. Description of the Prior Art

Many systems employing sensors such as inertial sensors (gyros and accelerometers) used in aircraft, have a need for automatically calibrating the sensors from time to time to remove the effects of accumulated drift over a period of time. In aircraft applications, three gyros and three accelerometers are usually used to sense the rotational and acceleration changes that occur during a flight. A computer then operates to determine the aircraft attitude, position and velocity from these changes.

In order to prevent errors in these readings, it has been the custom to calibrate the sensors when position and velocity are known such as at the airport terminals. When the computer knows the real position and velocity (as it does when the aircraft is at the terminal), it can determine which, if any, of the sensors have drifted and can produce a compensating signal to calibrate the erroneous sensor. Such a prior art system is shown in FIG. 1.

In FIG. 1, a set of three gyros labelled G1, G2 and G3 and identified by reference numerals 11, 13 and 15 are shown providing outputs on lines 17, 19 and 21 through summing circuits 23, 25 and 27 and lines 29, 31 and 33 to e. Navigation Processor 35.

Similarly, in FIG. 1, a set of three accelerometers labelled A1, A2 and A3 and identified by reference numerals 37, 39 and 41 are shown providing outputs on lines 43, 45 and 47 through summing circuits 49, 51 and 53 and lines 55, 57 and 59 to the Navigation Processor 35.

Navigation Processor 35 operates on the signals from Gyros 11, 13 and 15 and from the accelerometers 37, 39 and 41 to produce a signal indicative of latitude on a line 61, a signal indicative of longitude on a line 63, a signal indicative of altitude on a line 65, a signal indicative of north velocity on line 67, a signal indicative of east velocity on line 69, and a signal indicative of vertical velocity on a line 71, which signals are presented through summing circuits 73, 75, 77, 79, 81, and 83 and on lines 85, 87, 89, 91, 93 and 95 respectively to a box identified as Navigation Auto Calibration box 100 as well as to any desired aircraft indicators (not shown). It should be understood that while Navigation Processor 35 and Navigation Auto Calibration box 100 have been shown as two separate boxes for purposes of explanation, they may be combined in a single overall processor with a computer enclosed in a single box.

Summing circuits 73–83 are shown receiving additional inputs from terminals 101, 103, 105, 107, 109 and 111 via lines 113, 115, 117, 119, 121 and 123 respectively. When the aircraft is of known positions and velocities (such as at airport terminals), signals indicative of known latitude, longitude, altitude, north velocity, east velocity and vertical velocity respectively are presented to the terminals 101–111 and are combined in summing circuits 73–83 so that any differences or errors between the outputs from Navigation Processor 35 on lines 61–71 are presented to Navigation Auto Calibration box 100. From these inputs the Navigation Auto Calibration box 100 computes which, if any, of the gyros and accelerometers are in error, and operates to produce corrective signals, if any, on lines 125, 127, 129, 131, 133 and 135, which signals are fed back to the summing circuits 23, 49, 25, 51, 27 and 53 respectively so as to add the corrective signals to the erroneous signals from the gyros and accelerometers and thus provide the desired corrective calibration.

The prior art system of FIG. 1 is satisfactory for use when no more than 1 set of sensors (in this case, 3 gyros and 3 accelerometers) are used. However, redundant systems employ more than 1 set of sensors (in the present example this would be four or more gyros and/or accelerometers) and the prior art does not receive enough information in the arrangement shown in FIG. 1 to allow a determination of which specific gyros and accelerometers need corrective calibration.

SUMMARY OF THE INVENTION

The present invention solves the problem of auto calibration of redundant sensors by utilizing a concept of sensor parity. Sensor parity works to measure the consistency of redundant sensor outputs and to produce parity error signals whenever they are not consistent. The sensor parity error signals are independently presented to a parity auto calibration box which operates to provide signals indicative of sensor errors to a "mapper" which also receives sensor error signals from the Navigation Auto Calibration box and is able to determine from these two sets of signals, which, if any, of the specific gyros and accelerometers is in error and produces corrective calibration signals to be added to the erroneous sensor signals to provide auto calibration.

DETAILED DESCRIPTION OF THE PREFERRED EMBODIMENTS

Figure 1:
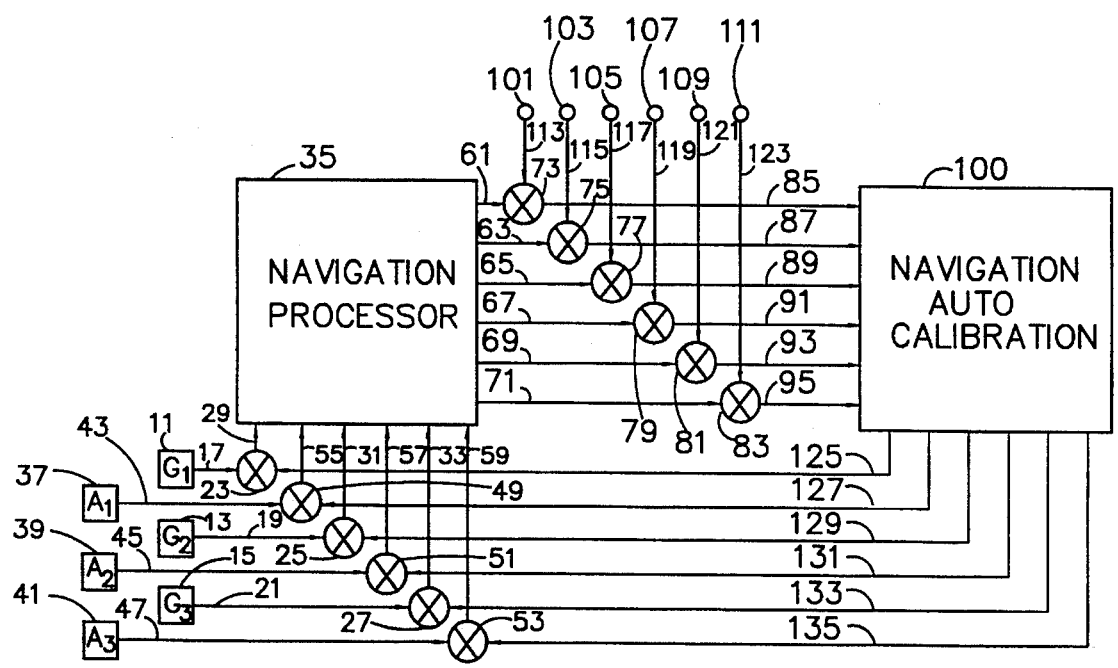
FIG. 1 is a block diagram of the prior art.
Figure 2:
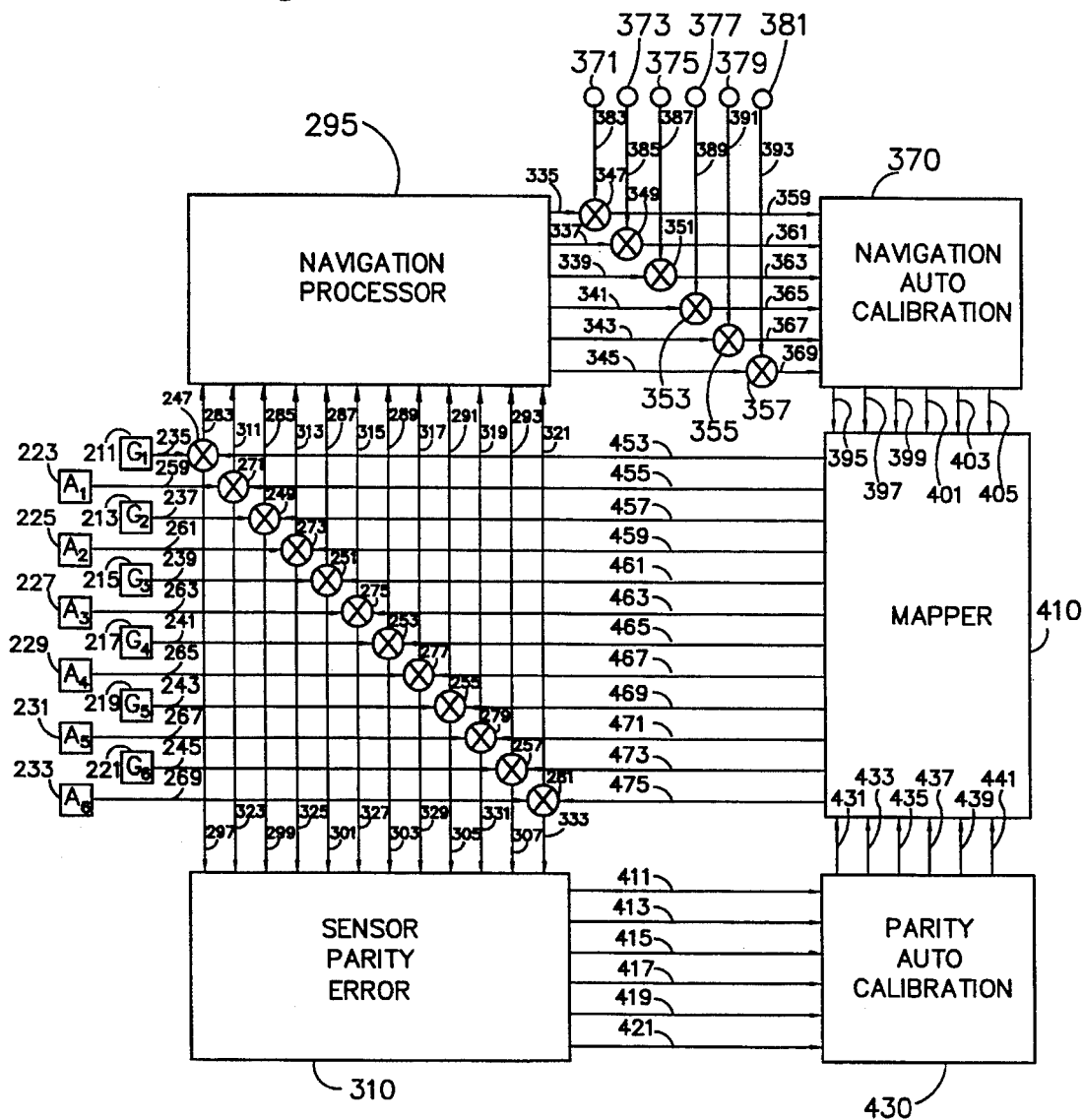
FIG. 2 is a block diagram of the present invention.

FIG. 2 shows a first redundant set of sensors (in this case, 6 gyros G1–G6) identified by reference numerals 211, 213, 215, 217, 219 and 221 and a second redundant set of sensors (in this case 6 accelerometers A1–A6) identified by reference numerals 223, 225, 227, 229, 231 and 233. The outputs of gyros 211–221 are presented via lines 235, 237, 239, 241, 243 and 245 to summing circuits 247, 249, 251, 253, 255 and 257 respectively while the outputs of accelerometers 223–233 are presented via lines 259, 261, 263, 265, 267 and 269 to summing circuits 271, 273, 275, 277, 279 and 281. Summing circuits 247–257 produce the gyro outputs via lines 283, 285, 287, 289, 291 and 293 to a Navigation Processor 295 and via lines 297, 299, 301, 303, 305 and 307 to a Sensor Parity Error Box 310. Similarly, summing circuits 271–281 produce the outputs of accelerometers 223–233 via lines 311, 313, 315, 317, 319 and 321 to the Navigation Processor 295 and via lines 323, 325, 327, 329, 331 and 333 to the Sensor Parity Error box 310. As in FIG. 1, the Navigation Processor 295 produces a longitude output on a line 335, a latitude output on a line 337, an altitude output on a line 339, a north velocity signal on a line 341, an east velocity signal on a line 343 and a vertical velocity signal on a line 345 except that these signals are derived from 6 gyro and 6 accelerometer inputs, rather than three, as was the case in FIG. 1, and are thus somewhat more accurate due to the redundancy. The signals on lines 335–345 are presented to summing circuits 347, 349, 351, 353, 355 and 357 and via lines 359, 361, 363, 365, 367 and 369 to a Navigation Auto Calibration Box 370. As in FIG. 1, the summing circuits 347–357 are shown receiving additional inputs from terminals 371, 373, 375, 377, 379 and 381 via lines 383, 385, 387, 389, 391, and 393 respectively. Signals indicative of known latitude, longitude, altitude, north velocity, east velocity and vertical velocity respectively are presented to the terminals 371–381 and are combined in summing circuits 347–357 so that any differences or errors between the outputs from Navigation Processor 295 on lines 359–369 are presented to Navigation Auto Calibration box 370. Now, however, because there are more than 3 gyros and 3 accelerometers, the Navigation Auto Calibration box 370 cannot determine which, if any, of the specific gyros and accelerometers are in error. It can, however, supply 6 signals on lines 395, 397, 399, 401, 403 and 405 partially indicative of the sensor errors to a "Mapper" 410.

In similar fashion, Sensor Parity Error box 310 operates on the gyro inputs from lines 297–307 and the accelerometer inputs from lines 323–333 to produce parity error signals on lines 411, 413, 415, 417, 419 and 421 which are presented to a Parity Auto Calibration box 430. Because there are more than 3 gyros and more than 3 accelerometers, Parity Auto Calibration box 430 can compute parity values which may be, for example, the sums of various weighted values for the redundant sensor outputs. The desired parity values are known so that Parity Auto Calibration box 430 produces six signals on lines 431, 433, 435, 437, 439 and 441 which are partially indicative of the sensor errors to "mapper" 410.

Mapper 410 with the 12 inputs it receives, is able to determine which, if any, of the specific gyros 211–221 and accelerometers 223–233 are providing erroneous signals and produces corrective signals on lines 453, 455, 457, 459, 461, 463, 465, 467, 469, 471, 473, and 475 to the summing circuits 247–257 (for gyros) and 271–281 (for accelerometers) to be added to the signals from gyros 211–221 and accelerometers 223–233 to produce corrective calibration signals.

As was the case in FIG. 1, although the Navigation Processor 295, the Navigation Auto Calibration box 370, the Sensor Parity Error box 310 and the Parity Auto calibration box 430 have been shown as separate boxes for explanation, they may be all part of a single processor or computer and combined in one box.

The algorithm equations for the Navigation Processor 295 are:

Equations:

$$\omega^B = H_g^* m_g$$

$$\alpha^B = H_a^* m$$

$$\dot{C} = C\{\omega^B\} - \{\rho + \Omega\}C$$

$$\dot{v} = C\alpha^B + g - (\rho + 2\Omega) \times v$$

$$\dot{D} = D\{\rho\}$$

Outputs:

$$\text{latitude} = \arctan\left(\frac{-d_{33}}{\sqrt{1 - d_{33}^2}}\right)$$

$$\text{longitude} = \arctan\left(\frac{-d_{23}}{-d_{13}}\right)$$

$$\text{altitude} = \int v_z - h_e$$

$$\text{north velocity} = v_x \cos(\alpha) - v_y \sin(\alpha)$$

$$\text{east velocity} = v_x \sin(\alpha) + v_y \cos(\alpha)$$

$$\text{vertical velocity} = v_z$$

where:

$m_g$ = vector of gyro signals (inputs to Navigation processor and Sensor Parity Error Boxes)

$m_a$ = vector of accelerometer signals (inputs to Navigation processor and Sensor Parity Error Boxes)

$H_g^*$ = least squares mapping of gyro inputs to the aircraft body frame $H_g^* = (H_g' H_g)^{-1} H^T$ (pseudoinverse of $H_g$)

$H_a^*$ = least squares mapping of accelerometer inputs to the aircraft body frame $H_a^* = (H_a' H_a)^{-1} H_a^T$ (pseudoinverse of $H_a$)

C = transformation matrix from the aircraft body frame to the local-level frame $\dot{C}$ = time derivative of C $$\begin{pmatrix} d_{11} & d_{12} & d_{13} \\ d_{21} & d_{22} & d_{23} \\ d_{31} & d_{32} & d_{33} \end{pmatrix}$$

$d_{ij}$ is an element of D in the $i^{th}$ row and $j^{th}$ column $\dot{D}$ = time derivative of D $$a = \text{wander angle} = \arctan\left(\frac{-d_{32}}{d_{31}}\right)$$

$$\underline{v} = \text{aircraft velocity vector relative to the earth} = \begin{pmatrix} v_x \\ v_y \\ v_z \end{pmatrix}$$

$\dot{v}$ = time derivative of v g = plumb-bob gravity vector $\rho$ = angular velocity vector of the local-level frame relative to the earth $\Omega$ = earth's angular velocity vector to an inertial frame $\alpha^B$ = aircraft non-gravitational acceleration vector $\omega^B$ = aircraft angular velocity vector relative to an inertial frame $h_e$ = altitude stablization signal {.} = skew-symmetric realization of the enclosed vector All above vectors are expressed with components in the local-level frame, except for $\alpha^B$ and $\omega^B$ which are in the aircraft body frame, and for $m_g$ and $m_a$ which are in the sensor input axis frame.

The algorithm equations for the Navigation Auto Calibration box 370 are:

$$b^n = b^{n(-)} + K(y - \phi b^{n(-)})$$

$$\underline{b}^n = \begin{bmatrix} \underline{b}_g^n \\ \underline{b}_a^n \end{bmatrix}$$

where:

$b_g^n$=gyro estimates in the aircraft body frame $b_a^n$=accelerometer error estimates in the aircraft body frame $b^{n(-)}$=vector of previously estimated sensor errors in the aircraft body frame, which have not yet been applied as sensor output corrections y=vector of measured navigation errors $\phi$=sensitivity matrix that predicts navigation errors due to sensor errors, i.e., given sensor errors $b^n$, the predicted navigation errors are given by $\phi b^n$ =gain matrix, such as computed by a Kalman Estimator The algorithm equations for the Sensor Parity Error box 310 are:

Equations:

$$p_g = V_g m_g$$

$$p_a = V_a m_a$$

$V_g$ is defined to satisfy the following two properties
1) $V_g H_g = 0$
2) $V_g V_g^T = I$ $V_a$ is defined to satisfy the following two properties
1) $V_a H_a = 0$
2) $V_a V_a^T = I$ where:

$m_g$=vector of gyro signals (inputs to Navigation processor and Sensor Parity Error Boxes)

$m_a$=vector of accelerometer signals (inputs to Navigation processor and Sensor Parity Error Boxes)

$P_g$=vector of gyro parity errors $P_a$ vector of accelerometer parity errors $V_g$=gyro parity coefficient matrix $V_g^T$=transpose of $V_g$ $V_a$=accelerometer parity coefficient matrix $V_a^T$=transpose of $V_a$ $H_g$=transformation matrix from the aircraft body frame to the gyro input axis frame $H_a$=transformation matrix from the aircraft body frame to the accelerometer input axis frame The algorithm equations for the Parity Auto Calibration box 430 are:

$$x_g = x_g^{(-)} + K_g(p_g - h_\phi x_g^{(-)})$$

$$x_a = x_a^{(-)} + K_a(p_a - h_v x_a^{(-)})$$

$$\underline{x}_g = \begin{bmatrix} \underline{b}_g^p \\ \underline{\mu}_g \end{bmatrix} \quad \underline{x}_a = \begin{bmatrix} \underline{b}_a^p \\ \underline{\mu}_a \end{bmatrix}$$

where:

$b_g^P$=vector of estimated gyro bias errors in the parity frame $b_a^P$=vector of estimated accelerometer bias errors in the parity frame $\mu_g$=vector of estimated gyro misalignment and scale factors $\mu_a$=vector of estimated accelerometer misalignment and scale factor errors $x_g^{(-)}$=previous estimate of $x_g$ which has not yet been applied as a sensor output correction $x_a^{(-)}$=previous estimate of a which has not yet been applied as a sensor output correction $P_g$=vector of gyro parity errors $P_a$=vector of accelerometer parity errors $h_{100}$=sensitivity matrix that predicts gyro parity errors due to gyro errors i.e., given gyro errors $x_g$, the predicted parity errors are given by $h_\phi x_g$ $$h_\phi = \begin{bmatrix} 1 & 0 & 0 & \Delta\phi_x & \Delta\phi_y & \Delta\phi_z & 0 & 0 & 0 & 0 & 0 & 0 \\ 0 & 1 & 0 & 0 & 0 & 0 & \Delta\phi_x & \Delta\phi_y & \Delta\phi_z & 0 & 0 & 0 \\ 0 & 0 & 1 & 0 & 0 & 0 & 0 & 0 & 0 & \Delta\phi_x & \Delta\phi_y & \Delta\phi_z \end{bmatrix}$$

$h_v$=sensitivity matrix that predicts accelerometer parity errors due to accelerometer errors, i.e., given accelerometer errors $x_a$, the predicted parity errors are given by $_v x_a$ $$h_v = \begin{bmatrix} 1 & 0 & 0 & \Delta v_x & \Delta v_y & \Delta v_z & 0 & 0 & 0 & 0 & 0 & 0 \\ 0 & 1 & 0 & 0 & 0 & 0 & \Delta v_x & \Delta v_y & \Delta v_z & 0 & 0 & 0 \\ 0 & 0 & 1 & 0 & 0 & 0 & 0 & 0 & 0 & \Delta v_x & \Delta v_y & \Delta v_z \end{bmatrix}$$

$\Delta\phi_x, \Delta\phi_y, \Delta\phi_z$=components of incremental angular motion in the aircraft frame $\Delta v_x, \Delta v_y, \Delta v_z$=components of incremental velocity in the aircraft frame $K_g$=gain matrix, such as computed by a Kalman Estimator $K_a$=gain matrix, such as computed by a Kalman Estimator The algorithm equations for the Mapper 385 are:

Equations:

$$b_g = H_g b_g^n + V_g^T b_g^P$$

$$b_a = H_a b_a^n + V_a^T b_a^P$$

Where:

$b_g$=total gyro error correction vector in the gyro input axis frame $b_a$=total accelerometer error correction vector in accelerometer input axis frame $b_g^n$=partial gyro error correction vector in the aircraft body frame (navigation frame)

$b_a^n$=partial accelerometer error correction vector in the aircraft body frame (navigation frame)

$b_g^P$=partial gyro error correction vector in the parity frame $b_a^P$=partial accelerometer error correction vector in the parity frame It is, therefore, seen that we have provided an automatic calibration system for redundant sensors through inexpensive yet effective use of existing components. Many changes will occur to those skilled in the art. For example, while gyros and accelerometers have been used to explain the present invention, other sensors may be employed. Also, while six gyros and 6 accelerometers have been shown, the present invention will work with any number of gyros and accelerometers in excess of 3. Also, while the invention has been described for use with position and velocity in 3 directions, use of all three is not necessary. In a preferred embodiment, for example, altitude is sensed by other instruments and is not autocalibrated by the present invention. Accordingly, we do not wish to be limited to the specific apparatus used in connection with the explanation of the preferred embodiment, We intend only to be limited by the following claims.

We claim:

1. Calibration apparatus for use with redundant condition responsive sensors having outputs indicative of the conditions sensed which outputs may contain errors produced by individual sensors comprising:

first computer means connected to receive the outputs of the sensors and to produce outputs indicative of desired conditions derived from the conditions sensed by the sensors;

second computer means connected to receive the outputs from the first computer means, to compare the outputs from the first computer means with known values for the desired conditions and to produce a first plurality of signals partially indicative of any errors from the sensors;

third computer means connected to receive the outputs of the sensors and to produce parity signals indicative of any difference between preselected combinations of weighted outputs of the sensors with a predetermined value;

fourth computer means connected to receive the parity signals and to produce a second plurality of signals partially indicative of any errors from the sensors;

mapper means connected to receive the first and second plurality of signals from the second and fourth computer means and to produce error correcting signals indicative of the errors produced by individual sensors; and feedback means connecting the error correcting signals to the outputs of the sensors to modify the outputs of any sensors that are in error so as to calibrate them.

2. Apparatus according to claim 1 wherein the feedback means further includes summing means for adding the error correcting signals to the signals from the sensors.

3. Apparatus according to claim 1 wherein the sensors include at least four gyros and the desired conditions from the first computer means comprise position.

4. Apparatus according to claim 3 wherein the position condition is at least longitude and latitude.

5. Apparatus according to claim 1 wherein the sensors include at least four accelerometers and the desired conditions comprise velocity.

6. Apparatus according to claim 5 wherein the velocity condition is at least velocity in north and east directions.

7. Apparatus according to claim 1 wherein the sensors include six gyros and six accelerometers and the desired conditions from the first computer means are at least longitude, latitude, velocity in the north direction and velocity in the east direction.

8. Apparatus according to claim 7 wherein the second computer means is also connected to receive inputs indicative of actual longitude, latitude, velocity in the north direction and velocity in the east direction to compare them with the outputs from the first computer means.

9. Apparatus according to claim 7 wherein the desired conditions from the first computer means are longitude, latitude, altitude, velocity in the north direction, velocity in the east direction and velocity in the verticle direction.

10. Apparatus according to claim 7 wherein the third computer means operates to combine the outputs of the six gyro in different ways to produce three parity signals and to combine the output of the six accelerometers to produce three more parity signals.

11. The method of calibrating a redundant plurality of sensors each producing an output signal indicative of a condition which signal may contain an error, comprising the steps of:

A. combining the outputs of the sensors to produce a first set of combined signals indicative of predetermined conditions;

B. comparing the first set of combined signals with a second set of signals indicative of the known values of the predetermined conditions and producing a first plurality of error signals indicative of any difference;

C. combining the outputs of the sensors to produce a second set of combined signals inductive of parity conditions;

D. producing a second plurality of error signals from the second set of combined signals indicative of any difference between the second set of combined signals and desired values;

E. computing form the first and second plurality of error signals a plurality calibration signals indicative of any errors produced by the plurality of sensors; and F. combining the calibration signals with the output signals of the sensors to effect calibration thereof.

12. The method of claim 11 wherein the sensors are more than three gyros and the first set of combined signals comprises a signal indicative of position.

13. The method of claim 11 wherein the sensors are more than three gyros and more than three accelerometers and the first set of combined signals comprises signals indicative of position and velocity.

14. The method of claim 11 wherein the sensors are at least six gyros and six accelerometers of an aircraft and the first set of combined signals comprises a first group of signals indicative of the position of the aircraft in at least two directions, and a second group of signals indicative of the velocity of the aircraft in the two directions.

15. The method of claim 14 wherein the two directions are latitude and longitude.

16. The method of claim 11 wherein the sensors are at least six gyros and six accelerometers of an aircraft and the first set of combined signals comprises a first group of signals indicative of the position of the aircraft in three directions, and a second group of signals indicative of the velocity of the aircraft in the three directions.

17. Apparatus according to claim 16 wherein the first group of signals is indicative of latitude, longitude and altitude.

\* \* \* \* \*